US007717786B1

(12) United States Patent
Falciglia, Sr.

(10) Patent No.: US 7,717,786 B1
(45) Date of Patent: May 18, 2010

(54) GAMING MACHINE AND GAME HAVING SEQUENTIAL SYMBOL MATCHING FEATURE

(76) Inventor: Sal Falciglia, Sr., 386 Highview Ter., Ridgewood, NJ (US) 07450

( * ) Notice: Subject to any disclaimer, the term of this patent is extended or adjusted under 35 U.S.C. 154(b) by 0 days.

(21) Appl. No.: 12/456,565

(22) Filed: Jun. 17, 2009

Related U.S. Application Data

(60) Provisional application No. 61/146,791, filed on Jan. 23, 2009.

(51) Int. Cl.
*A63F 3/06* (2006.01)
*A63F 13/02* (2006.01)
*A63F 13/10* (2006.01)

(52) U.S. Cl. .............................. 463/19; 463/16; 463/20

(58) Field of Classification Search ............. 463/17–19, 463/11–13, 16, 20, 30–33; 273/269, 270, 273/292
See application file for complete search history.

(56) References Cited

U.S. PATENT DOCUMENTS 4,743,024 A 5/1988 Helm et al.
4,953,869 A 9/1990 Muhammad
5,351,970 A 10/1994 Fioretti
5,393,057 A 2/1995 Marnell, II
5,411,258 A 5/1995 Wilson et al.
5,647,798 A * 7/1997 Falciglia ...................... 463/19
5,695,400 A 12/1997 Fennell, Jr. et al.
5,772,510 A 6/1998 Roberts
5,935,002 A * 8/1999 Falciglia ...................... 463/19
5,971,849 A * 10/1999 Falciglia ...................... 463/16
6,322,445 B1 * 11/2001 Miller ......................... 463/13
6,461,241 B1 * 10/2002 Webb et al. ................... 463/20
6,585,587 B2 * 7/2003 Falciglia, Sr. ................ 463/13
6,764,398 B2 * 7/2004 Stone et al. ................... 463/25
6,997,806 B2 * 2/2006 Falciglia, Sr. ................ 463/20
7,201,657 B2 * 4/2007 Baerlocher et al. ............ 463/20
7,316,397 B2 * 1/2008 Friedman .................... 273/274
2002/0055381 A1 5/2002 Tarantino
2002/0160827 A1 * 10/2002 Slomiany et al. .............. 463/16
2002/0187822 A1 * 12/2002 Falciglia, Sr. ................ 463/13
2003/0207707 A1 * 11/2003 Slomiany et al. .............. 463/16
2004/0021267 A1 * 2/2004 Falciglia, Sr. ............... 273/269
2006/0035699 A1 * 2/2006 Falciglia, Sr. ................ 463/19
2006/0135242 A1 6/2006 Tarantino
2007/0232379 A1 * 10/2007 Falciglia ...................... 463/19

FOREIGN PATENT DOCUMENTS

EP 0464935 3/1992
GB 2137392 6/1984

* cited by examiner

*Primary Examiner*—Peter DungBa Vo
*Assistant Examiner*—Matt D. Hoel
(74) *Attorney, Agent, or Firm*—Weide & Miller, Ltd.

(57) ABSTRACT

A game has the potential for multiple levels. Each level comprises a symbol matching event in which a set of base symbols are compared against a set of game symbol for potential matches. If a required minimum number of matches or another event is realized, the game may continue to the next level. The game symbols may be displayed in rows, such as rows of a matrix having m rows by n columns. The base symbols may then be displayed in a row having n positions, where the base symbol in an individual nth position is compared to the corresponding game symbol in the same nth position. The game may be played as a wagering game offering awards for individual symbol matches or matches of patterns of symbols in the matrix. The game may include additional features such as wild symbols, automatic advance features and mystery bonuses.

23 Claims, 8 Drawing Sheets

GAMING MACHINE AND GAME HAVING SEQUENTIAL SYMBOL MATCHING FEATURE

RELATED APPLICATION DATA

This application claims priority to U.S. Provisional Application Ser. No. 61/146,791, filed Jan. 23, 2009.

FIELD OF THE INVENTION

The present invention relates to a symbol matching game and gaming machines and systems for presenting games.

BACKGROUND OF THE INVENTION

Wager and amusement gaming continues to grow in popularity. Nonetheless, casinos and other establishments that offer wager based gaming face the challenge of developing new and exciting games in order to maintain player interest. One example of a popular game which is presented in both amusement and wager-based formats is the game of SLINGO (registered trademark of Slingo, Inc.). This game was originally developed well over a decade ago and is the subject of numerous patents. However, in order to not only maintain the interest of existing players of the original game but to draw additional players to the game, the inventors herein have developed a new and exciting version of the game which implements a new game play mechanic and new game play features as compared to the original game.

SUMMARY OF THE INVENTION

One aspect of the invention comprises methods of presenting and playing games. Another aspect of the invention comprises gaming machines and gaming systems for presenting at least one game.

In one embodiment of a game, a single game has the potential for multiple levels. Each level comprises a symbol matching event in which a set of base symbols are compared against a set of game symbols for potential matches. If a required minimum number of matches or other criteria are met, the game may continue to the next level. The game symbols may be displayed in rows, such as rows of a matrix having m rows by n columns of symbol positions. The base symbols may then be displayed in a row having n positions, where each base symbol in an individual $n^{th}$ position is compared to the corresponding game symbol in the same $n^{th}$ position.

In one embodiment, the game is played as a wagering game. Awards, such as credits representing monetary value, may be awarded for matches of individual game symbols and/or matches of patterns of game symbols.

As one example of a method, a wager is accepted from a player. A first row of n game symbols is then activated relative to a matrix of symbol positions. A row of base symbols having n positions is displayed. The base symbol in each $n^{th}$ position is then compared to the corresponding game symbol in the same position for potential symbol matches. One or more awards may be awarded for symbol matches. If a required number of symbol matches are not received relative to the first row of game symbols, the game may end. If a required number of symbol matches are received relative to the first row of game symbols, the game preferably continues by repeating the following sequence until there are no unactivated rows of symbol positions on the matrix: (1) activating a next row of game symbols relative to the matrix of symbol positions; (2) displaying a new set of base symbols; (3) comparing the base symbols and game symbols which are in corresponding positions for potential symbol matches; (4) awarding awards for symbol matches; (5) if a required number of symbol matches are not received relative to the next row of game symbols, ending the game; and (6) if a required number of symbol matches are received (or other advancing criteria are met) relative to the next row of game symbols, repeating steps (1)-(6).

Additional aspects of the invention comprise game features. The game features may be utilized with games of the invention or other games. For example, in one embodiment, awards for winning events in higher levels of the game may be higher than those in lower levels of the game. For example, matches of game symbols in a first row may yield a first range of awards, while matches of game symbols in a second row may yield a second higher range of awards.

In one embodiment, a game may include one or more wild symbols. A wild symbol may be matched to any game symbol. In one embodiment, the wild symbol may be a Joker which is displayed as one or more of the base symbols. A methodology may be applied to the application of a Joker to maximize the player's winnings. For example, Jokers may be matched to particular game symbols in a manner which yields high award symbol matching patterns or which match game symbols in higher levels (having higher awards associated therewith).

A game may also include mystery bonuses or prizes, as well as a game advance feature. In one embodiment, the game advances from one level to another if a required minimum number of symbol matches are received relative to a first level or row of game symbols. In another embodiment, a player might receive a game advance symbol, such as a frog, which causes the game to advance to the next level even if the required number of symbol matches is not received.

A wide variety of aspects of games, gaming machines and game features will be appreciated from the description herein. As detailed herein, one or more games offer a player substantial excitement relative to the potential of advancing through multiple levels of a game. This excitement is enhanced when the game is played as a wagering game offering the player opportunities for winnings.

Further objects, features, and advantages of the present invention over the prior art will become apparent from the detailed description of the drawings which follows, when considered with the attached figures.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

One aspect of the invention comprises methods of presenting and playing games using symbols or indicia. One embodiment of a game is a symbol matching game in which one or more sets or rows of base symbols are matched to sets or rows of game symbols. Preferably, the game has the potential for multiple levels such that if a player receives a requisite number of symbol matches in each level, the game advances sequentially to a next level. Other aspects of the invention comprise gaming machines and systems for implementing or presenting the games of the invention.

Figure 1:
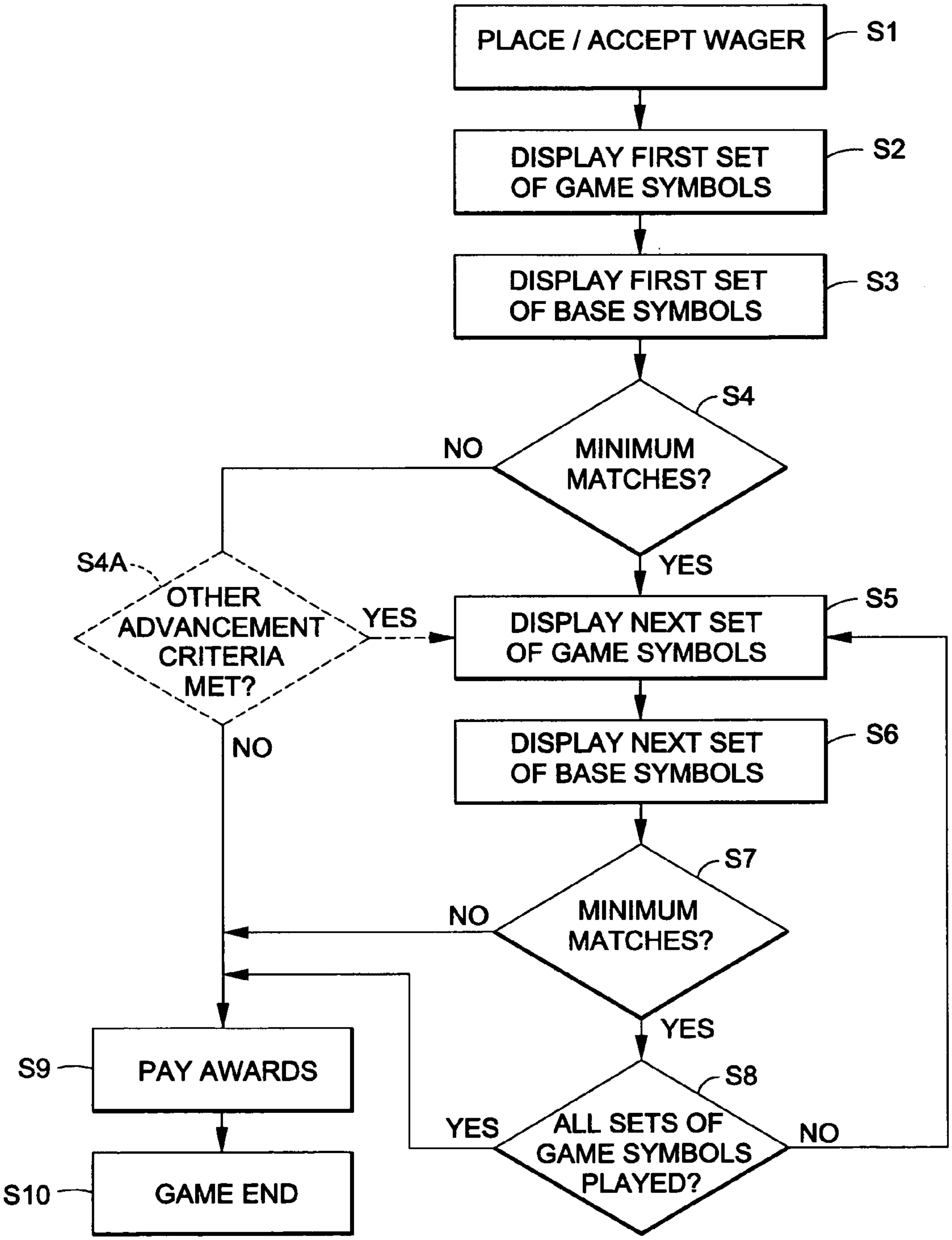
FIG. 1 is a flow diagram of a method of presenting/playing a game in accordance with one embodiment of the invention.

FIG. 1 is a flow diagram illustrating one embodiment of a method of game play/presentation in accordance with the invention. In one embodiment, a game of the invention is presented as a wager-based game. Thus, in accordance with a step S1, a player may place a wager. Such a wager may be accepted by a game operator, such as at a gaming machine. As indicated below, the wager might comprise money, chips, tokens, credits or the like having physical form or merely represented electronically.

In accordance with the game, in a step S2, a first set of game symbols is displayed or made active related to a first set of positions. Preferably, the first set of game symbols comprise a sub-set of a larger set of symbols, or comprise the random distribution of a set of symbols. Such symbols may have various forms and may comprise letters, numbers, words, images or the like. In one embodiment, the symbols in the set of symbols may all be unique. In preferred embodiments, one or more of the symbols in the set of symbols may be duplicated or repeated. For example, the first set of game symbols may comprise five (5) symbols selected from a larger set of fifteen (15) symbols. In one embodiment, the first set of game symbols is displayed in a row of n columns. Preferably, there are at least 1 and more preferably, at least 5, columns.

In a step S3, a set of base symbols is displayed for matching to the first set of game symbols. In a preferred embodiment, the set of generated base symbols is equal in number to the symbols in the first set of game symbols. For example, if the first set of game symbols comprises a row of five (5) symbols, the set of base symbols comprises five (5) symbols. Preferably, the set of base symbols is randomly generated.

In a preferred embodiment, symbols in the first set of game symbols and the set of base symbols are compared positionally. In one embodiment, the first set of game symbols and the set of base symbols are arranged into a row of n columns, and the symbols in each $n^{th}$ column are compared with one another.

In one embodiment of the game, the object is to match as many of the base symbols and game symbols which are in corresponding positions, as possible. As detailed below, awards may be provided for matches. Preferably a match occurs if the symbols in corresponding positions are the same.

In one embodiment of the game, if certain game criteria are met, then the game continues on to a next level or portion of the game. In a preferred embodiment, in a step S4, if a certain minimum number of matches are achieved relative to the first set of game symbols, the game continues with play of a second set of game symbols. For example, a player may be required to achieve at least one match relative to the first set of game symbols to advance the game to the next level and play the second set of game symbols. In that event, a second set of game symbols is displayed or rendered active, as in a step S5. Preferably, the second set of game symbols comprises the same number of symbols as the first set of game symbols. For example, the second set of game symbols may comprise a row of n columns of symbols. The second set of game symbols may be displayed adjacent the first set of game symbols, such as in a matrix directly above the first set of game symbols.

As illustrated in FIG. 1 and as described in more detail below, in one embodiment, the criteria for advancing might comprise other than a minimum number of matches. For example, the game might advance if a player received a particular special symbol, such as a "frog" which symbolizes entitlement of the player to leap or advance automatically to the next row or level. In such a configuration, the game may include an additional step, such as a step S4A in which a determination is made as to whether such additional criteria for advancement have been met.

Another set of base symbols is then displayed for matching to the second set of game symbols, as in a step S6. Preferably, this set of base symbols is randomly selected and so may differ from the first set of base symbols. Once again, the generated base symbols are compared to the second set of game symbols for potential matches. Awards may again be provided for matches. If a certain minimum number of matches are achieved relative to the second set of game symbols (or, as detailed below, other criteria are met), as in a step S7, the game may continue to a third set of game symbols. This process may repeat until all of the sets of game symbols are displayed, as in a step S8. For example, in one embodiment, a total of m rows by n columns of symbols may be displayed in a matrix format. The first set of game symbols may comprise a first row of n columns of symbols; the second set of game symbols may comprise the second row of n columns of game symbols, and so on. In a preferred embodiment, there may be twenty-five (25) symbols arranged into a five by five (5×5) matrix.

If the player successfully advances through all of the levels of the game and/or if the requisite number of symbol matches are not received, then awards received for the game may be paid, as in step S9. As described in greater detail below, awards may be provided for symbol matches or other events. In one embodiment, the awards may comprise credits. The awards might also or instead comprise points, tangible goods, discounts, tickets, money (such as coins or paper currency) or the like. The game may then end at a step S10.

In accordance with the invention, a game is provided which includes a game "advance" feature. In particular, a single game has the potential to comprise multiple levels or portions. If a player achieves certain thresholds or requirements, the player may advance or move from a first level of the game through additional levels of the game. In this manner, a player is enticed to try and reach the final stage or level of the game. Further, the play of the game in levels progressing from a first level to a final level enhances the excitement of the game.

Figure 2A:
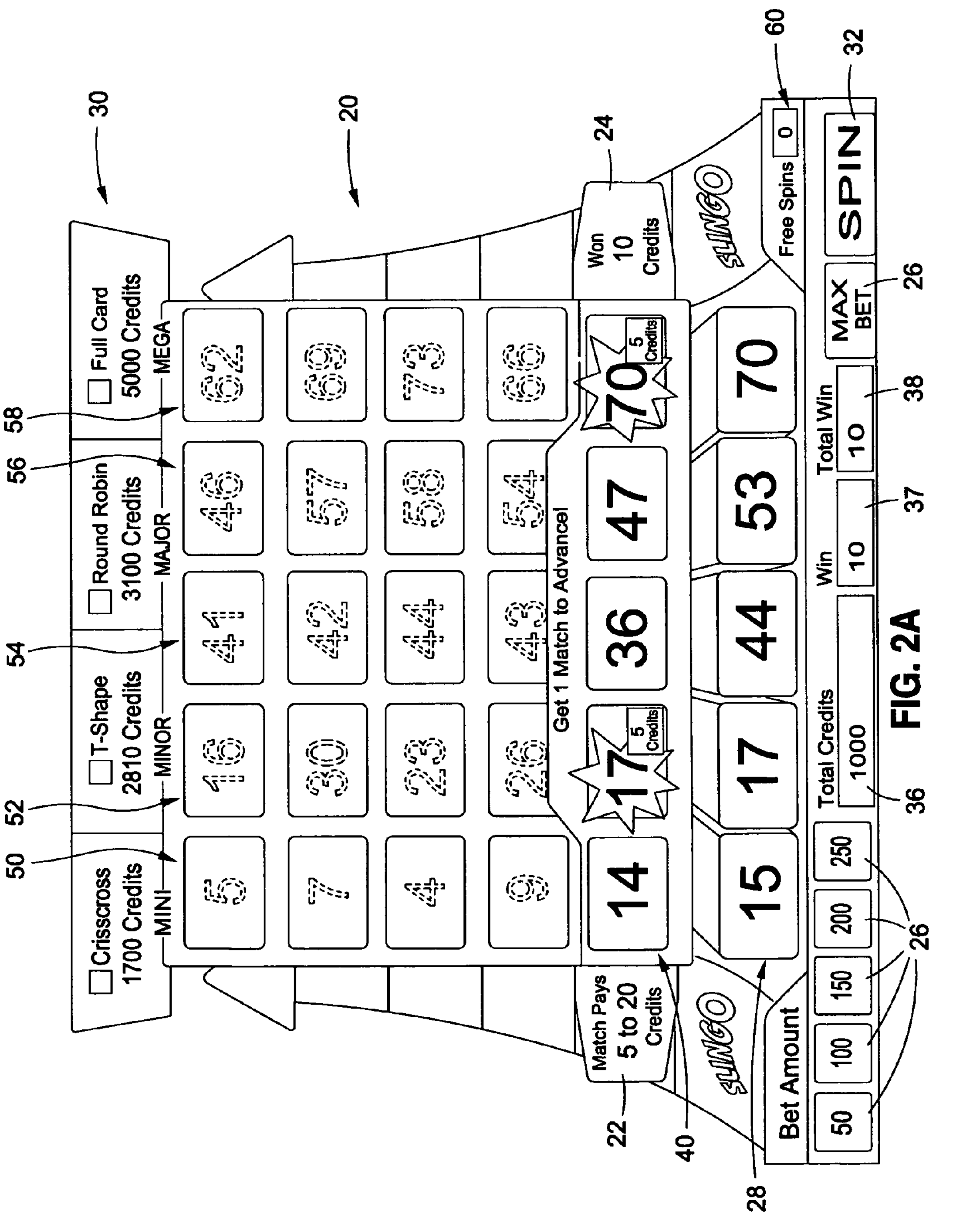
FIGS. 2A-2F are exemplary game interfaces showing various game events.

One embodiment of a preferred embodiment of a game in accordance with the invention will be described with reference to FIGS. 2A-2D. Referring to FIG. 2A, in one embodiment of the game, game information is displayed to a player. As detailed below, this game information might be displayed as a graphical user interface by a video display, such as a display of a gaming machine or computer.

In one embodiment, the game information comprises sets of game symbols to be matched, sets of generated base symbols, and bet and win information, among other information. In one embodiment, a matrix 20 of symbol positions is displayed. In a preferred embodiment, the matrix 20 has five (5) rows and five (5) columns for a total of twenty-five (25) positions.

In one embodiment, each of the positions of the matrix 20 has an associated symbol or indicia. Preferably, the symbols are randomly selected, such as by one or more random number generators. As detailed below, at the start of the game, only a first row 40 of symbols is active. Thus, the other symbols associated with the matrix may not yet be displayed or might be displayed in a different fashion (such as in a shaded fashion as shown in FIG. 2A). Likewise, the first row 40 of symbols may be highlighted or displayed in a manner indicating that those symbols are active.

In one embodiment, the symbols in the matrix may be referred to as the "game symbols" of symbols, in that these symbols do not change during the play of the game.

The game information also includes sets of symbols to be matched to the game symbols. In one embodiment, a row of base symbols 28 is displayed. In a preferred embodiment, this set of symbols 28 may change during the game. Preferably, there are a number of base symbols equal to the number of symbols in each set of game symbols, such as equal to the number of columns in the matrix 20. Thus, where the matrix 20 has five (5) columns, there are five (5) base symbols. In a preferred embodiment, the base symbols 28 are arranged into a row positioned below the matrix 20.

A payout range 22 may be indicated relative to one or more of the game symbols. In one embodiment, a payout range 22 is indicated relative to each row of symbols. For example, such may be indicated to the left or right side of each row of the matrix 20. The payout range 22 may indicate one or more values or a range of values for awards for matches of the designated symbols (such as the symbols in that row).

An award total 24 may be indicated. In one embodiment, an award total 24 may be indicated relative to each row of symbols, such as to the right of each row of symbols.

A variety of other information may also be displayed to the player. For example, various bet amount buttons 26 may be provided. These bet amount buttons 26 may permit a user to place wagers in particular amounts, such as amounts of 50 credits, 100 credits or the like, including a "max bet" which permits the player to place the maximum wager allowed by the game.

The interface may also display information such as the total number of credits belonging to the player 36, the number of credits won by the player for a particular portion of the game 37, a total win for the game 38, and a number of free spins 60.

In one embodiment, the game may offer one or more bonus awards. Such may comprise progressive awards which change in value over time. Information regarding these various awards may be displayed, such as in a progressive jackpot window 30 at the top of the interface.

Of course, the arrangement, content and appearance of the interface may vary. For example, the interface may utilize various artwork such as colors and themes. The size of the interface and the arrangement of the features thereof may vary.

As detailed below, a player may provide input to the game in various manners. In one embodiment, such may be by input to a touch screen relative to one or more of the buttons or areas of the interface. Input might also be provided to external devices such as physical buttons or the like.

In one embodiment, game play begins by a player placing a wager. In one embodiment, this may be by the player providing input to one of the bet amount buttons 26. Game play may then automatically be initiated or it may be initiated by a player providing input to a "spin" or similar button 32. In one preferred embodiment, if a player places a maximum wager, such as by pressing the "MAX BET" button, the game automatically starts. On the other hand, if a player places a wager less than the maximum wager, such as by placing a wager of an amount such as 50, 100, 150, etc. credits, then the player may be required to also press the Spin button 32 to then start the game.

In a first portion or level of the game, only a first row 40 of the matrix 20 is active. As indicated above, the symbols of that row 40 may be highlighted or otherwise designated to indicate to the player the active status thereof. In one embodiment, the player is also provided with information regarding the number of matches to the symbols of the first row which are necessary to advance in the game and the value of awards for matches. In one embodiment, one or more matches are required to advance past the first level of the game.

A set of base symbols 28 is displayed, such as below the first row 40 of game symbols. The base symbols 28 may be displayed in alignment with the symbols in the first row 40. Preferably, the symbols in corresponding positions of the base symbols 28 and the first row 40 of game symbols are compared to determine if they match. In the embodiment illustrated, this comprises comparing the symbols in the same columns 50, 52, 54, 56, 58. Thus, the symbol in the first position of the base symbols 28 is compared to the symbol in the first position of the first row 40 of symbols (i.e. the symbols in the first column 50 are compared). If the symbols match, a match may be declared or indicated, such as by highlighting the matched symbol in the first row 40. In the example illustrated in FIG. 2A, the base symbol "15" is compared to game symbol "14" in the first column 50, the base symbol "17" is compared to the game symbol "17" in the second column 52, the base symbol "44" is compared to the game symbol "36" in the third column 54, and so on. Obviously, in this example, the only base symbols "17" and "70" match corresponding game symbols "17" and "70" in the second column 52 and fifth column 58. Such a match may be indicated by highlighting the game symbol, showing a new symbol in that symbol location or the like.

As indicated above, the game may be played with a variety of symbols. Such may comprise numbers, letters, icons or images, or combinations thereof. In one preferred embodiment, the game is played with the numbers 1-75. The numbers 1-15 are used relative to the first column, the numbers 16-30 are used relative to the second column, and so on. Thus, one or more random number generators may be used to select a number from the group 1-15 for each of the positions in the first column. In one embodiment, the numbers in each column are unique. In this configuration, the sets of base symbols are selected from the same groups of numbers. For example, each time a set of base symbols is generated for matching to each row of game symbols in the matrix, the base symbols are selected from the set 1-15 as to the first position, 16-30 as to the second position, etc.

In one embodiment, awards are randomly generated and assigned to each position in the matrix 20. The awards may be selected from the indicated value range 22. For example, relative to the first row 40 of game symbols, awards may be randomly selected from the range of 5 to 20 credits for each symbol position. In a preferred embodiment, the range for each row or level of the game increases relative to the previous row or level, and the particular awards or ranges are preferably higher for games where the player places a higher wager.

In the event of a match, the number of credits (or other value, award or additional game feature) which was assigned to that symbol position is preferably awarded to the player. The particular award for a match may be shown, such as in the matrix 20 adjacent to the symbol which was matched, as illustrated in FIG. 2A. In one embodiment, the symbol that was matched may be removed from the matrix 20 and the winning award may be indicated in its place. In addition, the total of the awards for a particular row or level may be indicated in the award total area 24 for the row.

In the event a player meets the required criteria for the first level, the player may advance to a second level of the game. In the preferred embodiment, as indicated, this criterion comprises a minimum number of symbol matches. As described above, however, a player might advance based upon other criteria, such as the appearance of a game advance symbol.

Figure 2B:
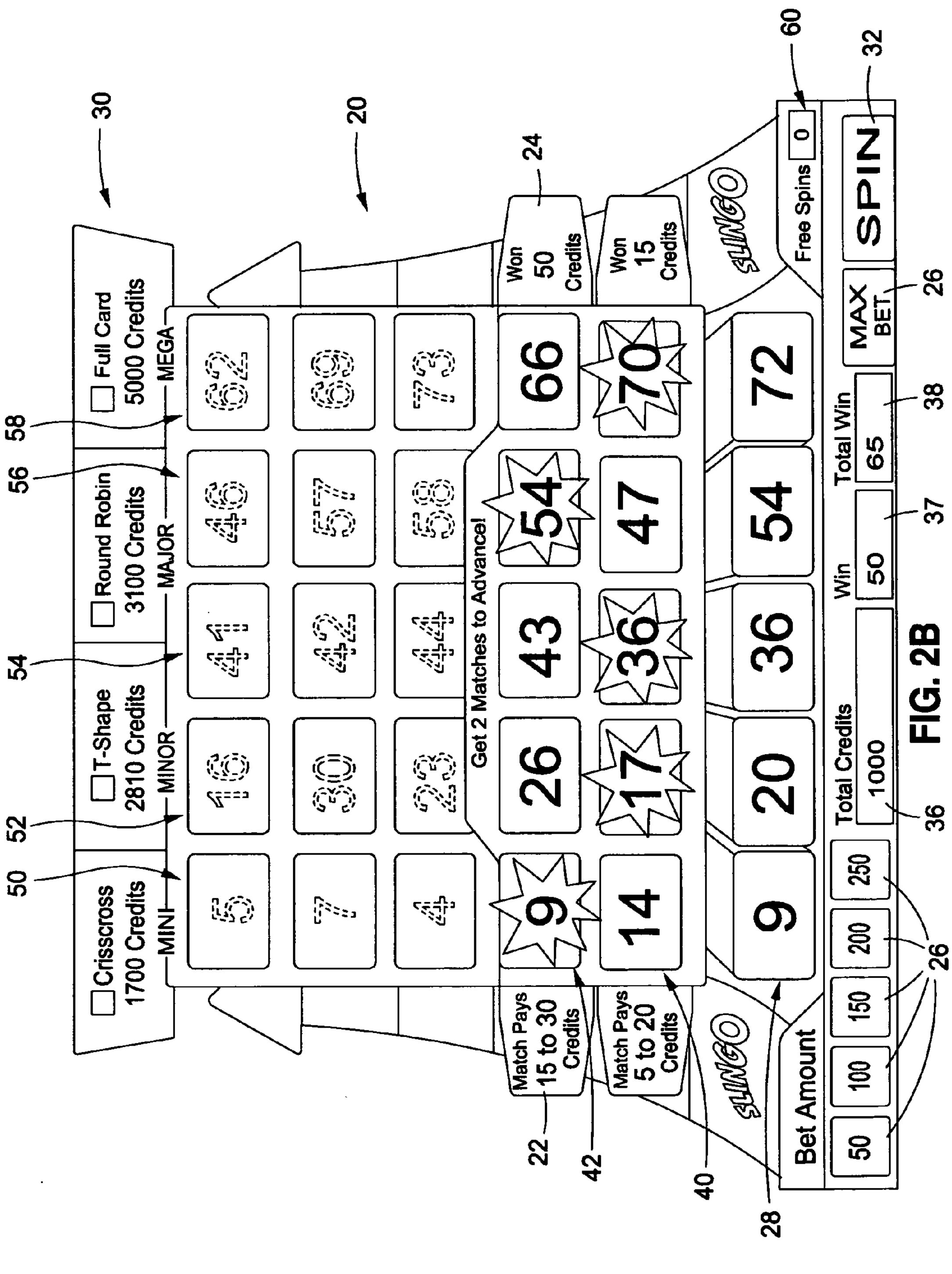

If the player does not meet the required criteria, such as the required minimum number of symbol matches, the game preferably ends. If the player does meet the required criteria, the game preferably moves or advances to the next portion or level of the game. Preferably, at this time, a second row 42 of game symbols becomes active, as illustrated in FIG. 2B. Again, the game symbols in the second row 42 may at that time be highlighted or another designation may be provided to the player to indicate that those symbols are active.

A second set of base symbols 28 is then generated for comparison to the second row 42 of game symbols. The second set of base symbols 28 is preferably again randomly selected and compared position by position to the game symbols in the second row 42. As with the first row 40, matches preferably have associated awards and the total of the awards for the row may be indicated to the player.

In a preferred embodiment of the invention, once a row or level of game symbols has been activated, the row or level remains active and can be matched through the entirety of the game. In this manner, a player may receive matches relative to symbols in earlier activated rows or levels and receive additional awards, including improving the probability of receiving patterns or combinations of matches across multiple rows or levels. For example, as illustrated in FIG. 2B, the number "36" in the second set of base symbols 28 does not match the corresponding number "43" in the second row 42 of game symbols, but it does match number "36" in the previously activated first row 40 of game symbols. As a result, an additional award of 5 credits has been paid to the player for that match.

Once again, if certain criteria are met, the game preferably continues. In one embodiment, this again comprises a certain minimum number of matches. Preferably, this number is equal to or greater than that required to advance from the first row 40 of game symbols. For example, a single match may be required to advance from the first row 40, and two matches may be required to advance from the second row 42. If such a requirement is not met, the game preferably ends. If the requirement is met, the game preferably continues or advances to the next level.

Figure 2C:
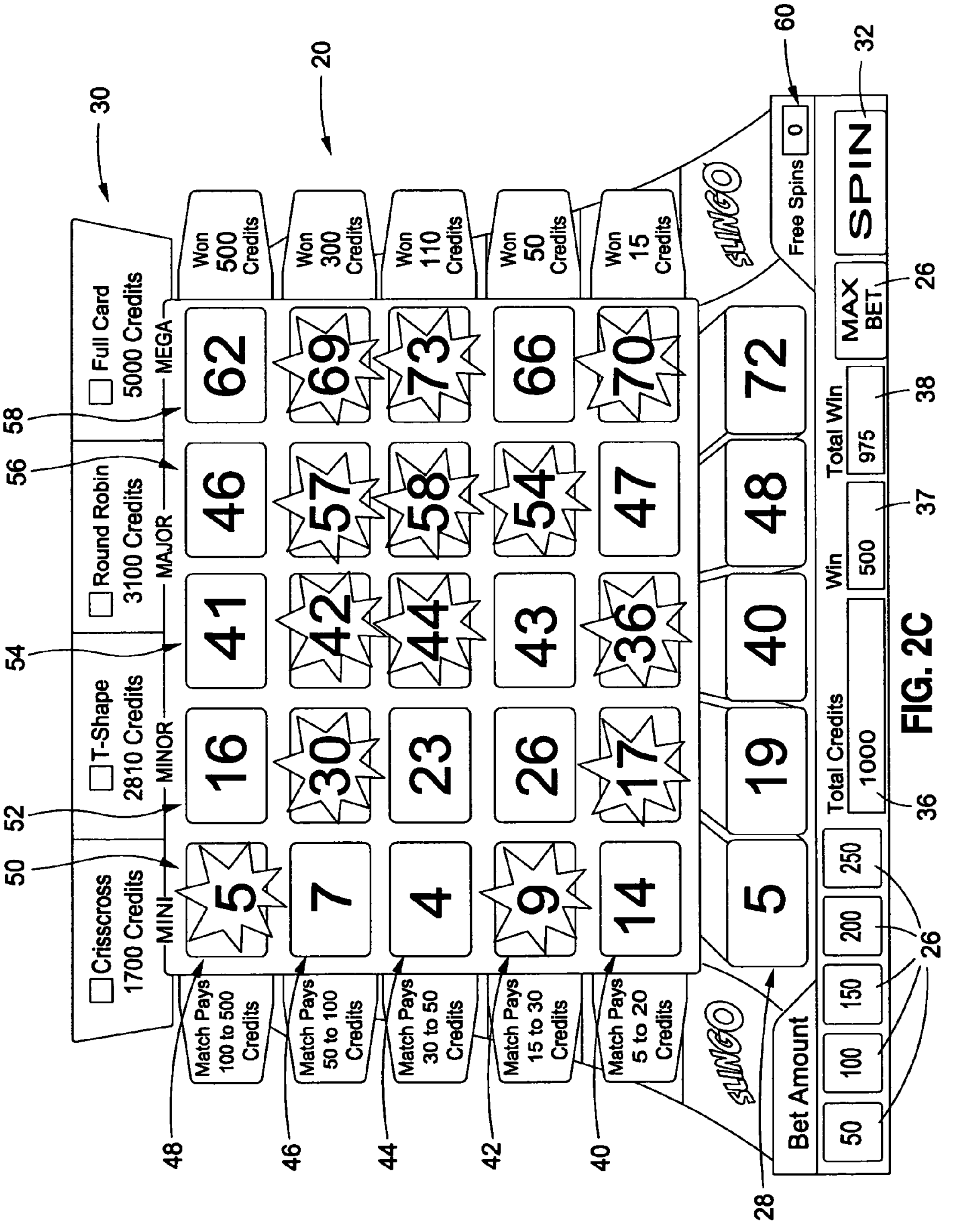

In the configuration illustrated where there are five (5) rows, this game preferably continues in this fashion by the game either ending or continuing to the next level to a third row 44, a fourth row 46 and a fifth row 48, as illustrated in FIG. 2C. Once the game reaches the fifth row or level and matches are determined relative to the fifth row 48, the game ends. Again, when the player advances to the next level or row, a new set of base symbols 28 is generated and displayed for comparison to the current active row of game symbols.

Additional aspects of the invention will now be described in detail.

In one embodiment, a player keeps accrued winnings even if the game ends before the player reaches the final level. Thus, for example, if the player won 10 credits by matches relative to the first row 40, the player would retain those winnings regardless of how far the player advances in the game. In other embodiments of the game, however, the player might be required to reach the final level in order to win the awards accrued during the game.

In a preferred embodiment, the game comprises a single game with multiple levels. Thus, when a player places at least a minimum wager, the player has the opportunity to play the game through all of the levels without any additional wager. In other embodiment, the player might be required to place a wager to continue through each level.

In one embodiment, the game may include other types of awards. For example, awards might be represented by secondary symbols in the event of a match. In one embodiment, one or more gold coins (or other symbols) might be associated with game symbols or game symbol positions. If the player receives a match as to that symbol or that position, then the gold coin may be displayed to the player. Instead of a normal award, the player may receive a higher than normal award for that match. In one embodiment, that award might comprise a randomly selected value (such as from a pre-defined set of values like 10, 25, 50, 75, 100 or 200 credits). Such a value might be awarded directly, or it might be multiplied by the player's wager.

In one embodiment, a player may be awarded one or more free spins. Such spins may be indicated in a free spin area 60 of the interface. Free spins may be awarded based upon various criteria, including randomly and as a secondary award to a symbol match. In one embodiment, a player may utilize a free spin to obtain another set of base symbols relative to a particular level of the game. For example, a player may advance to the second level of the game, wherein the second row 42 of game symbols is activated. After a set of base symbols 28 is generated or activated, the player might have received only a single match. If two matches are required to advance from the second level to the third level of the game, the game would normally end. However, if the player has a free spin, the player may use that spin and to cause another set of base symbols 28 to be generated. That extra set of base symbols may result in additional matches of the game symbols in the second row 42. If so, the game may then advance to the next level (third row).

In one embodiment, if a player reaches the final level and the player has one or more free spins remaining, the free spin(s) may be used and the extra set of base symbols may be generated and may be compared to the game symbols in any of the rows or levels. This may result in additional matches and additional awards.

In one embodiment, a player may receive awards for combinations of symbol matches. In a preferred embodiment, a player receives an award for matching all of the symbols along a single row, a single column or a diagonal of the matrix. Such a combination of matches may be referred to as a SLINGO (registered trademark of Slingo, Inc.). The awards for such combinations of matches may vary. In one embodiment, the award for a diagonal SLINGO combination is higher than that for a vertical combination, which is in turn higher than that for a horizontal combination.

Figure 2D:
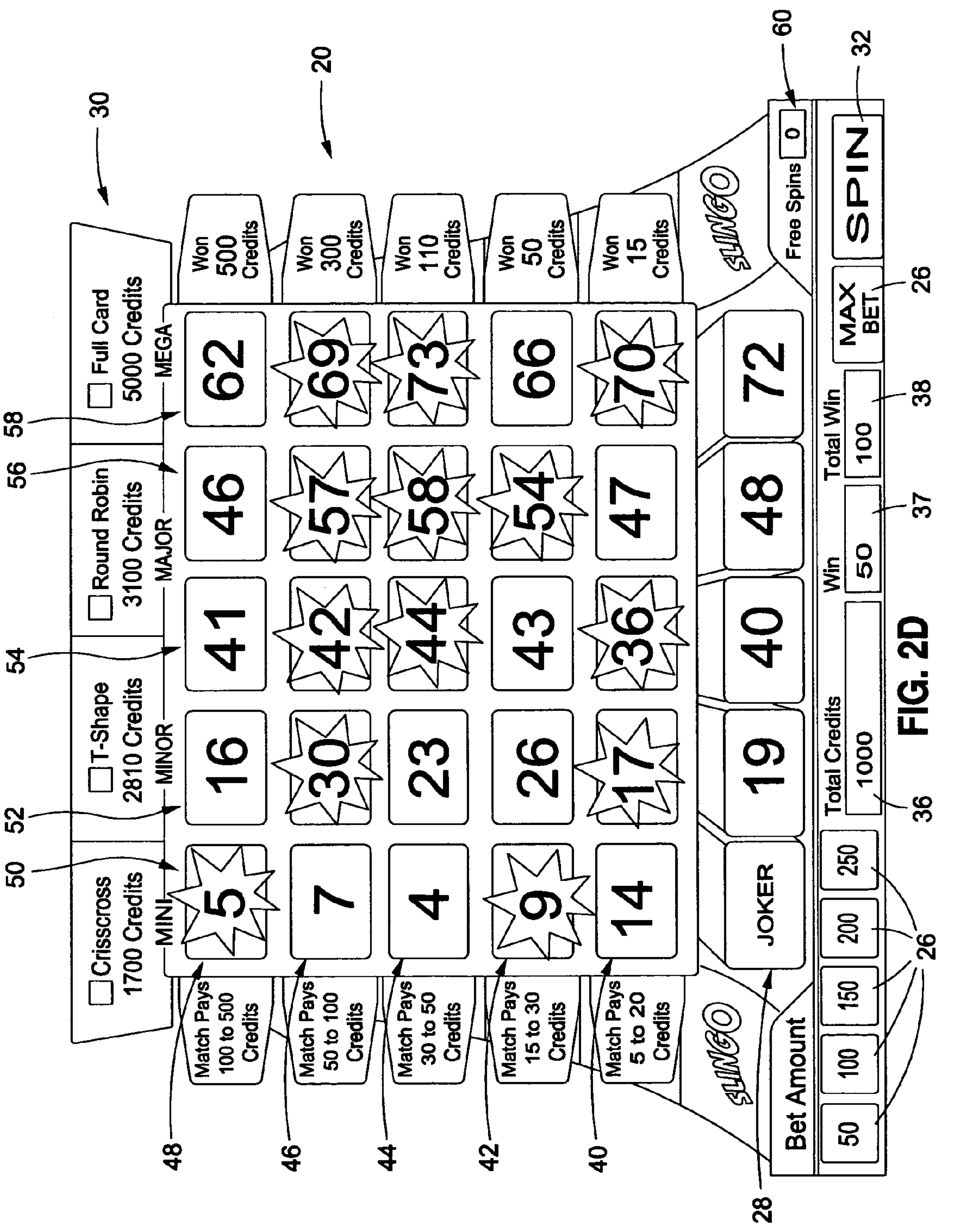
Figure 2E:
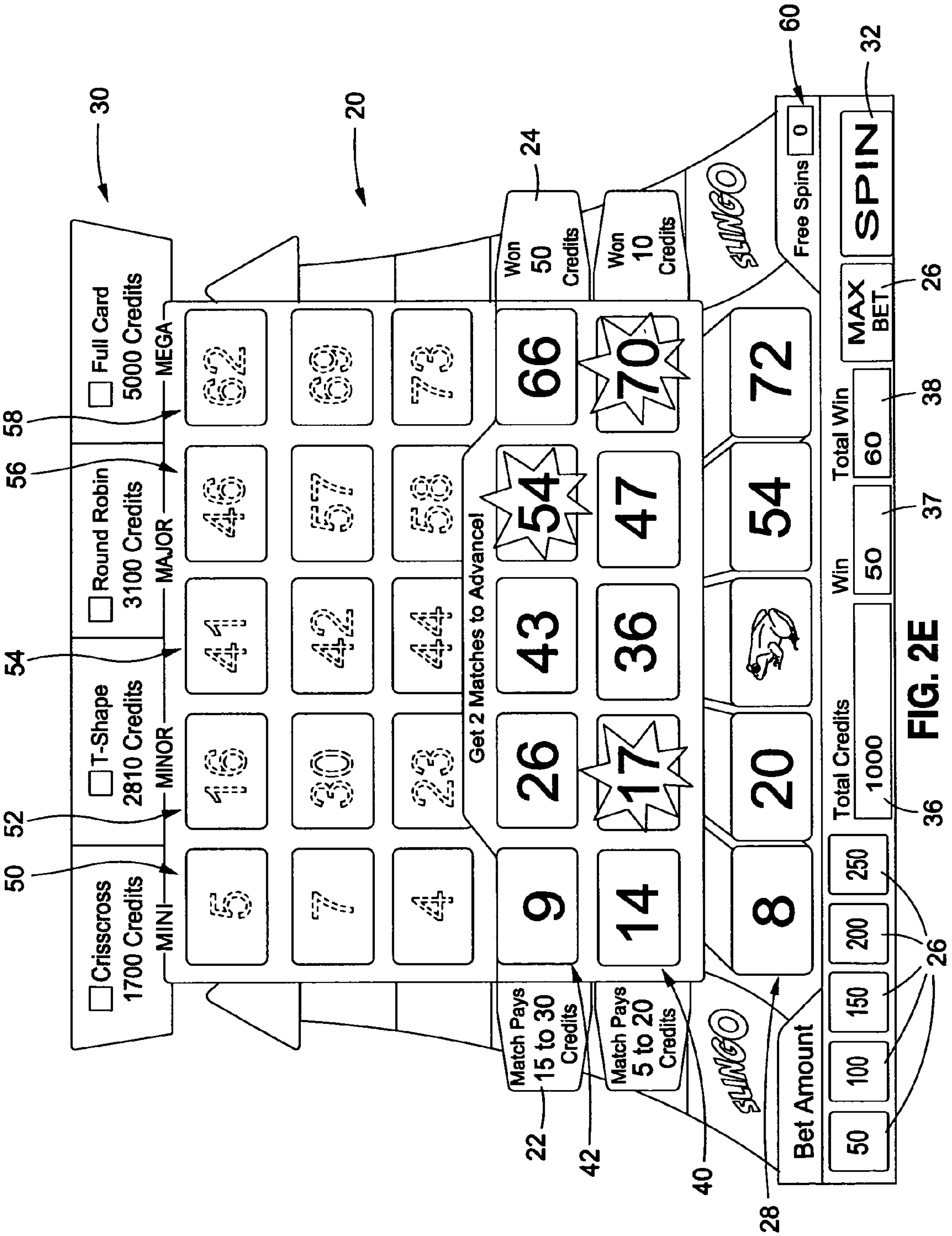
Figure 2F:
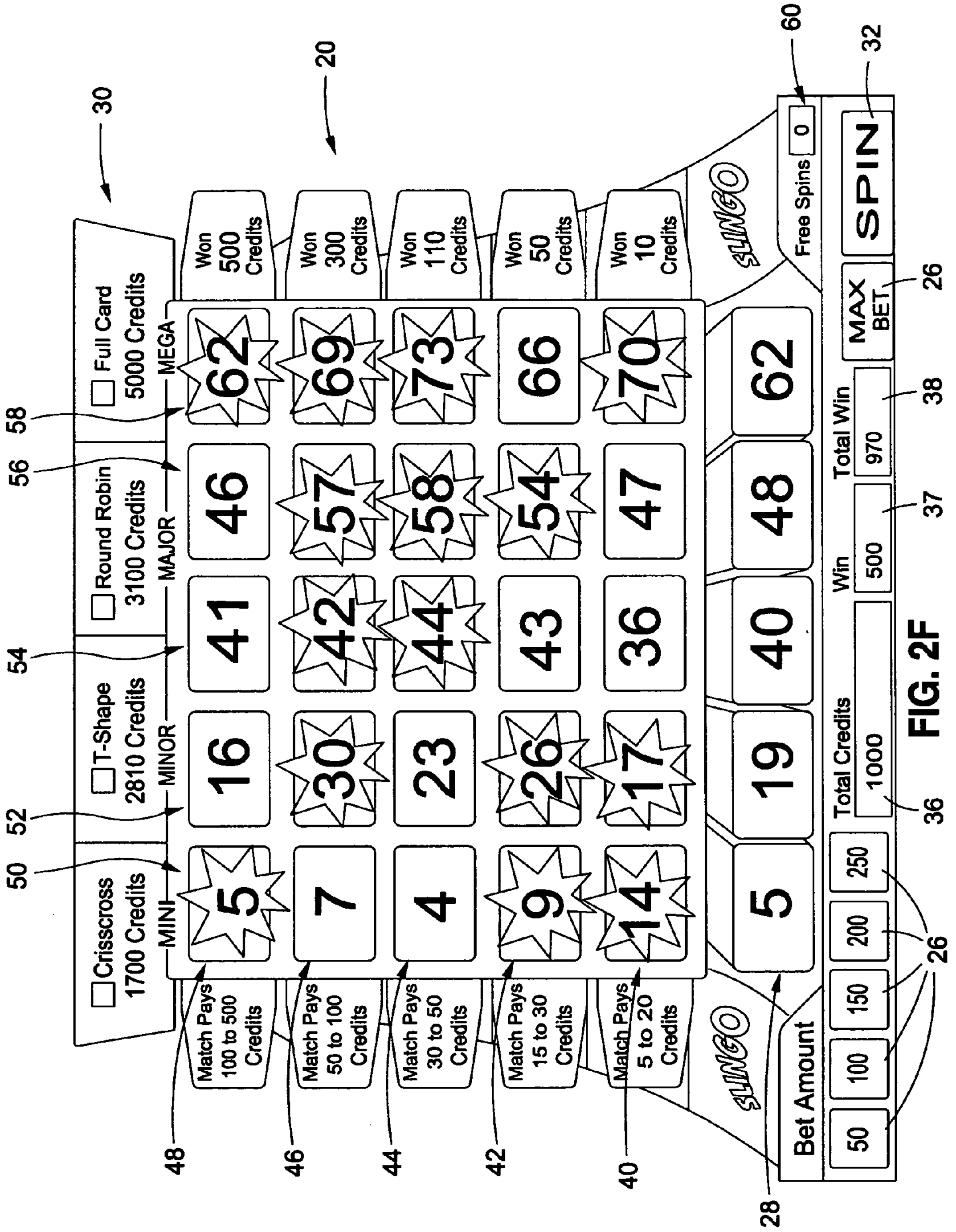

Further, awards might be provided for other patterns or combinations of symbol matches such as an "X" pattern as illustrated in FIG. 2F, or other patterns such as "four corners" or the like. Such patterns might vary depending upon the arrangement or configuration of the game symbols.

FIG. 2C illustrates an example of the game where a player has advanced to the final level. As a result of the comparison of another set of base symbols 28 to the last row of game symbols 48, the player has completed a SLINGO combination in the form of a set of symbol matches along one of the diagonals through the matrix 20.

As indicated above, the interface may be configured to display a jackpot window 30. That window may display the amounts of one or more jackpots. The jackpots may comprise large payouts for particular events, such as the receipt of particular combinations of symbol matches. The jackpots might comprise fixed amounts or comprise variable amounts. For example, one or more of the jackpots might comprise progressive jackpots. Such jackpots may grow in value over time. The jackpots may be funded in various manners. For example, the jackpots may be funded from a portion of wagers at one gaming machine or a plurality of gaming machines, as is known in the art.

The game may include a variety of other features. In one embodiment, a player may be permitted to advance to the next level even if the minimum number of symbol matches is not obtained. In one embodiment the game may be configured to randomly generate an "advance" symbol relative to one or more of the symbols. The advance symbol might comprise a "frog" symbol. If the symbol is generated relative to a particular row, then the play of the game preferably automatically advances to the next level or row. In one embodiment, such a symbol may be received relative to any row except the last (fifth row 48 in this case). In a preferred configuration, if such a symbol were assigned to a position in the fifth row and a match occurred relative to that position thus triggering the symbol, the symbol is instead treated as a free spin award. In that event, the frog symbol would not appear, but instead the number of free spins would be incremented in the free spin area 60.

FIG. 2E illustrates one example of such a feature. As illustrated, relative to play of the second row 42, the player received only a single match of a base symbol 28 to a game symbol, that of the number "54" in the fourth column. Normally, this would result in the game ending because the player did not receive the required minimum number of 2 symbol matches. However, in this example, the player received the "frog" symbol in the set of base symbols 28. This symbol resulted in the game automatically advancing to the next row or level of the game (see step S4A of FIG. 1). In another embodiment, instead of such a symbol appearing as one of the base symbols 28, the symbol might be associated with a symbol position in the matrix 20, wherein if that symbol is matched, the "frog" or other advance symbols is released (for example, the "frog" symbol might have been associated with the number "54" in the matrix, such that when that number was matched, the "frog" symbol was released and displayed, causing the game to advance).

In one embodiment, the game may include wild symbols. Such symbols might comprise, for example, a Joker, as illustrated in FIG. 2D. In one embodiment, a Joker which is displayed as one of the base symbols may be matched to any active game symbol. In one embodiment, there is a preferred hierarchy for determining which game symbol a Joker will be applied to as a match. There are often several combinations of rows where each Joker can be applied or matched. In one embodiment, the gaming machine evaluates (such as by a sub-routine) each valid combination and assigns a point score to each one to determine which one will maximize the player's winning payout. Each possible combination of Joker placement is evaluated for the following:

1) If a combination completes a progressive jackpot pattern, then this combination is given top priority;

2) If a combination enables the player to advance to the next row, this combination is given second priority;

3) If a combination completes one or more designated or selected symbol combinations, such as on or more SLINGO combinations (i.e. one or more rows, columns, or diagonal matches), then that combination is given third priority. The more of such combinations that are completed, the higher priority it gets over other combinations of this kind; and 4) Otherwise, a Joker(s) is placed in the highest row(s) possible.

In the event that two combinations are given equal priority, the routine will assign a point score to each Joker according to which row each Joker in the combination will be placed in. The higher the row, the higher the score.

As one example, a Joker may be displayed in the first and third positions or columns of the base symbols. Assume that the first Joker can only be placed at either the second, third or fourth row and that the middle Joker can only be placed in the third row. Also, assume that a criss-cross progressive jackpot would be completed if the center position of the matrix were completed (which is the only position the second Joker can be placed). In this event, there are three possible combinations:

1) First Joker placed at row two, second Joker placed at row three;

2) First Joker placed at row three, second Joker placed at row three; or

3) First Joker placed at row four, second Joker placed at row three.

Each combination will complete the criss-cross pattern. However, in accordance with the above-described preferences, two points are assigned to the first combination since the first Joker will be placed in the second row, three points for the second combination, and so on. The third combination would thus ultimately be chosen since it completes the criss-cross pattern while maximizing the player's winnings by placing the non-pattern-completing Joker at the highest row possible (since winnings for symbol matches have a higher range for higher levels or rows).

FIG. 2D illustrates another example of the placement of a Joker. In this case, the player has advanced to the last level of the game and is playing the fifth row 48 of game symbols. As illustrated, the first symbol of the base symbol set 28 is a Joker. The Joker could be placed in the fourth row 46 and complete a winning SLINGO combination along that row. However, a better result is obtained for the player by placing the Joker in the fifth row 48, since that placement then both completes a SLINGO combination (a diagonal) and results in placement of the Joker in a higher level or row, thus resulting in potential higher winnings for the player.

When determining the best combination, it is important to note that the gaming machine can account for matches made by other base symbols. All other symbol matches are processed first, even though they may be made subsequent the positions with Jokers.

In another embodiment of the invention, a game may include a mystery bonus. Such a bonus may be indicated by an animated character such as a Cherub. The Cherub may appear randomly, such as by being displayed on the interface after a set of base symbols are displayed or after a player has unsuccessfully completed a level (so that the game would otherwise end). In one embodiment, the Cherub could result in additional awards to the player and potentially prevent the game from ending. When the Cherub is displayed, it could do some or all of the following features: (1) match game symbols of the matrix 20; (2) add Jokers to the base symbols 28; (3) automatically advance the player to the next row or level of the game; and (4) award one or more free spins (such as by increasing the free spin count in the free spin area 60), thus permitting the display of a new set of base symbols.

As one example, the Cherub could be displayed on the screen and be configured to randomly select symbols for matching to the active game numbers displayed in the matrix 20. Such additional matches yield additional winnings to the player and may result in the player receiving a required number of matches as to the current row to advance to the next level/row. For example, the Cherub might be animated and use a wand to select particular displayed game symbols, at random, that automatically are designated as matches (even though they were never matched by a base symbol).

As another example, the Cherub could be displayed on the screen and be configured to add one or more Jokers to a base symbol set. Those Jokers could then be used to match one or more game symbols as in the manner above, again triggering additional awards for a player and potentially resulting in the player advancing to the next game level. The Cherub might add a single Joker or multiple Jokers. For example, the Cherub might be animated and use a wand to convert already displayed base symbols (such as numbers) into Jokers.

As another example, the Cherub could be displayed on the screen and award a player a free advance to the next level/row. When the Cherub does this; the matrix will increase by one (1) row and the player will automatically be given another spin, thus receiving an additional opportunity for matches. This feature would only be active if the player has not already reached the final level or row.

As a final example, the Cherub could be displayed on the screen and cause another set of base symbols to be displayed relative to a particular row of game symbols (i.e. a “free spin”). The new base symbols may result in additional matches of game symbols in the active row, yielding additional awards and potentially advancement to the next level/row. For example, the Cherub might be animated to use a wand to cause the base symbols to rotate or spin to a new set of base symbols.

The Cherub may be configured to appear only appear once during the game and may accomplish one or more features, such as those described above. In order for the Cherub to be active, a player may be required to place a wager of a certain size. In another embodiment, the player may be required to place a side of bonus wager in order to activate the feature. For example, the player might be required to place an additional wager of 50 credits to activate the feature above and beyond the base wager the player places.

As indicated, a player may be permitted to place wagers in various amounts. In one embodiment, the size of a player’s wager may determine the number of game features which are activated. For example, a wager of 50 credits may activate the “Jokers” feature; a wager of 100 credits may further activate the “Gold Coins” feature; a wager of 150 credits may activate the “Frog” feature; a wager of 200 credits may activate the “Free Spins” feature; and a maximum wager of 250 credits may activate the “Jackpots” feature. Of course, the size of the wagers and the types of features which are activated may vary.

In one embodiment, presentation of the game may be automatic and may not require player input beyond the player being required to place a wager and, in some embodiments, starting the game via the “spin” button or the like. For example, the game may automatically display the base symbols and compare those symbols to the first row of game symbols and indicate any matches. If the required number of matches is received, the game may automatically move to the second level, etc. In other embodiments, however, the player might be required to provide various inputs. For example, a player may be required to compare the base symbols to the game symbols and indicate matches, such as by providing input to a touch screen proximate to a matching symbol. A player might also be required to provide a “spin” input in order to initiate each level of the game. A player might also be required to provide input to utilize a free spin.

It will be appreciated that the game may comprise the play of various number of game symbols. For example, instead of a 5×5 matrix of game symbols, the matrix might be a 4×2, a 6×7, a 3×5, a 4×4, or an 8×8 matrix or the like. In addition, the number of game symbols in different rows could potentially vary. For example, there might only be three (3) game symbols in the first row, four (4) in the second row, and so on. In such event, the number of base symbols which are displayed may vary to match the corresponding number of game symbols in the active row.

It will also be appreciated that while the game may advance through rows of a matrix starting at the bottom of the matrix and working upwardly, the game might advance in other manners. For example, the rows could be played from top to bottom. In another embodiment, the sets of game and base symbols might be displayed in completely different fashions other than the displayed matrix configuration.

In one embodiment, the base symbols may be referred to as “spun” symbols. In particular, as detailed below, the base symbols might be displayed by one or more mechanical spinning reels. Alternatively, they might be displayed in graphical from via a video display in a manner which makes it appear that symbols are spinning and stopping at positions to display the base symbols. Of course, the base and game symbols may be displayed in various manners and via various mechanisms.

While games of the invention may be played as wager-based games, it is possible for the games to be played as amusement games. In some cases, such games may still require that a player provide payment to play the game (though no monies may be awarded as prizes). In other embodiments, however, a player may not be required to make any payment or place any wager.

Figure 3:
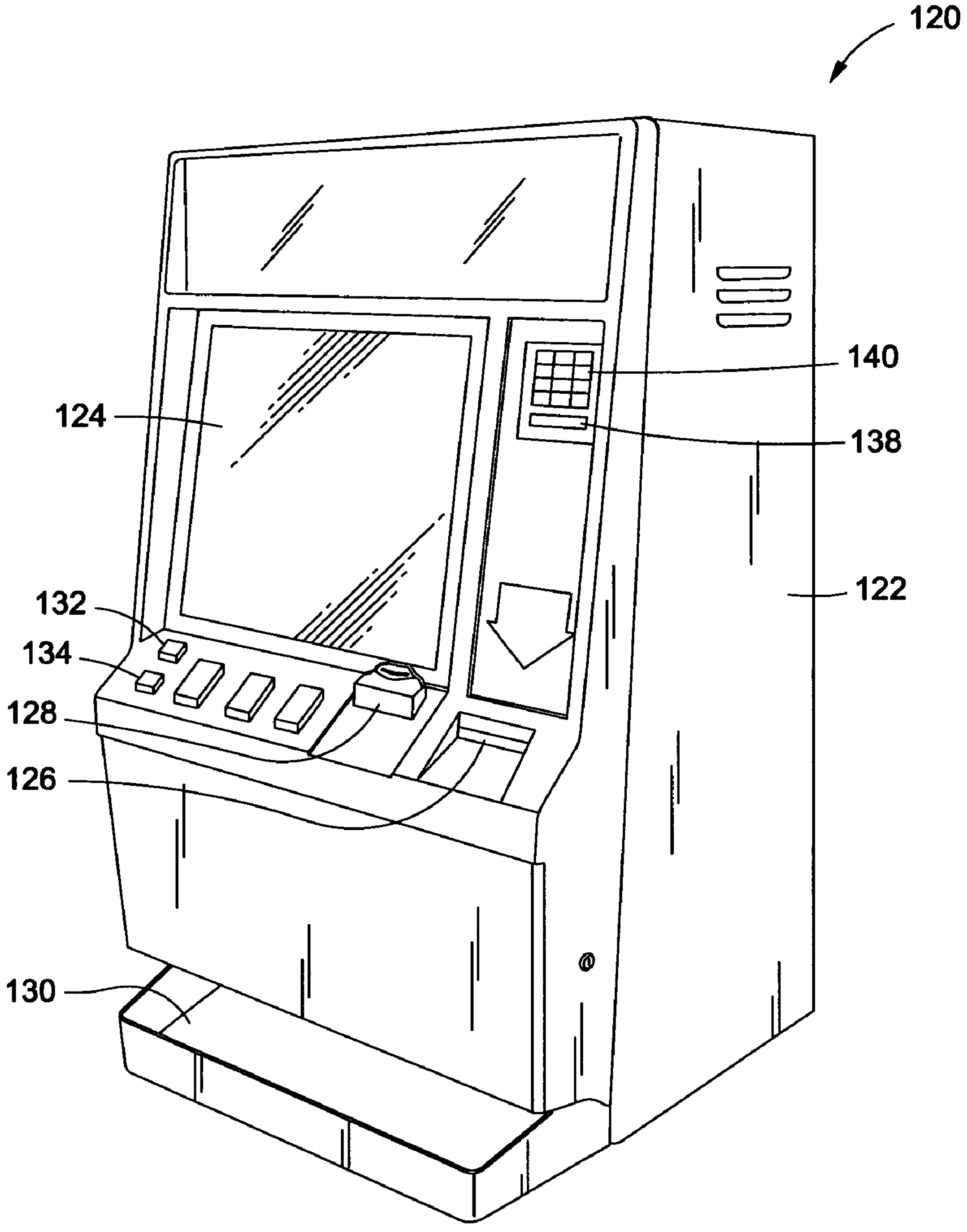
FIG. 3 illustrates a gaming machine for presenting one or more games, such as games of the invention.

The invention may be implemented via one or more gaming machines 120, such as illustrated in FIG. 3. Such gaming machines 120 might comprise casino-style gaming machines or personal computers or the like. For example, when configured as a casino-style gaming machine, the gaming machine 120 includes a housing or cabinet 122 for enclosing/supporting various components of the gaming machine. The housing 122 may have a variety of configurations. In one embodiment, the housing 122 is configured so the machine has an “upright” configuration. The machine 120 might also be configured as a “slant”-type, “bar-top” or have other forms.

In one embodiment, the gaming machine 120 is configured as a “video” type gaming machine, the machine including at least one display 124 for displaying game information to a player. The gaming machine 120 may include other means for providing information to a player. For example, speakers (not shown) or other devices may be provided for generating sound associated with the game. The gaming machine 120 may also include lights, printed instructions and other displays/display devices.

In one embodiment, a player must make payment in order to be entitled to play the game. Preferably, the game is presented as a wagering type game, and a player must place a bet or wager in order to play the game for the opportunity to receive winnings. Preferably, if the player is a winner of the game, the player is provided an award, such as a monetary payout (such as coins), credits representing monetary value, points or tangible prizes. As illustrated, the gaming machine 120 may include a bill validator/acceptor 126 for accepting paper currency and a coin acceptor 128 for accepting coins. Other means of payment, such as a credit card reader, may be provided. An award of winnings in the form of coins may be paid to the player via a coin tray 130.

Preferably, the gaming machine 120 includes means for a player to provide input. In one embodiment, this means comprises one or more buttons. For example, a “spin” button 132 may be provided for permitting a player to start a game. One or more wager buttons 134 may be provided for a player to select the amount to bet on a particular game. Other means of input may be provided, such as a touch-screen display and other devices now known or later developed.

A game controller (not shown) is provided for controlling the various devices of the gaming machine and for providing game information. For example, the game controller may be arranged to generate video and audio data for presentation by the display and speakers of the gaming machine 120. The game controller may be arranged to detect a signal from the coin acceptor indicating the receipt of coins or from the bill validator regarding accepted bills and for registering credits corresponding to those inputs, for subtracting credits for wagers placed by a player, and for causing a coin delivery mechanism to deliver coins from a coin hopper to the coin tray 130 for payment of winnings and/or return to a player of unwagered credits. Preferably, the one or more player input devices provide an output to the gaming controller for use in play of the game. For example, in response to a "bet one" input by a player, the gaming controller is preferably transmitted a signal which causes the gaming controller to initiate presentation of the game.

The gaming machine may include one or more random number generators for generating random game events and results. As indicated above, such a random number generator might be utilized to generate the game symbols for the positions of a matrix, be utilized to generate the base symbols, and be utilized to select award values for each symbol position, among other things.

It will be appreciated that the gaming machine 120 may have a variety of configurations, and that the gaming machine 120 illustrated and described above is but an example of a device for implementing the game of the present invention. For example, in one or more embodiments, the gaming machine 120 may be associated with a network and receive game information remotely and may transmit information, such as payout and game play information, to a remote location. For example, a remote master controller may generate game information which is transmitted over a communication link to the gaming machine 120. That information may be utilized by a local controller or processor to present the game, such as by displaying game play data or information.

As indicated, in one embodiment, game information is displayed by a video display 124 to a player. That display may be of a variety of types, including CRT, LCD, plasma and others. The gaming machine 120 may also include more than one video display.

In another embodiment, the gaming machine 120 may include one or more physical reels capable of displaying symbols. In such a configuration, means are provided for rotating the physical reels. In one or more embodiments, the means may comprise a mechanical linkage associated with a spin arm, with movement of the spin arm (a "pull") by a user causing the reels to spin. In such an arrangement, the reels are generally allowed to free-wheel and then stop. In another embodiment, electronically controlled mechanisms are arranged to rotate and stop each reel. Such mechanisms are well known to those of skill in the art. In this arrangement, actuation of the spin arm or depression a spin button causes a controller (not shown) to signal the activation of the spin mechanism associated with one or more of the reels. Preferably, the controller is arranged to either turn off the signal to the device(s) effecting the rotation of each or all of the reels or generates a signal for activating a braking device, whereby the reels are stopped. As is well known, the combinations of reel positions and their odds of hitting are associated with the controller, and the controller is arranged to stop the reels in a position displaying a combination of indicia as determined by the controller based on the combinations and odds. The principal of such an arrangement is described in U.S. Pat. No. 4,448,419 to Telnaes, which is incorporated herein by reference. For example, the base symbols might be associated with spinning reels. Sets of base symbols might be generated by spinning those reels.

The gaming machine 120 may have other configurations, including other features. For example, the gaming machine 120 may include a player tracking device, such as a card reader 138 and associated keypad 140. Such player tracking devices are well known and may permit the game operator to track play of players of the gaming machine. The tracked play may be utilized to offer player bonuses or awards.

In one embodiment, the gaming machine 120 may be configured to dispense media, such as printed paper tickets, which have associated value. For example, winnings or unused credits may be returned to the player via a printed ticket having value or associated value. In one embodiment, the gaming machine 120 might also be configured to accept such media for providing credit for game play. Such systems are well known and thus not described in detail herein.

As indicated, in a preferred embodiment, the games of the invention are played as wagering type games in which a player must place a wager in order to play the game for an opportunity of winnings. However, in other embodiments, the games may be played for fun or prizes. In such event, the player may be permitted to play the game for free or may be required to make payment to play the game.

As indicated above, a player may provide value to the gaming machine 120 or machine operator in a number of ways, including with coins or bills. The player might also be permitted to provide value remotely. Value provided to the gaming machine 120 may be represented as credits. Each credit may have an associated monetary value.

The gaming system might include additional elements. As indicated above, the game may implement various progressive jackpots. In one embodiment, a plurality of gaming machines may be linked to one or more progressive servers. These servers may receive wager information from the gaming machines for use in managing the jackpots (including incrementing the jackpots to larger values). The progressive servers may also monitor game results for potential progressive jackpot wins. In the event of a win, the progressive servers may award a jackpot win to a player and may reset the progressive jackpot for that win back to a pre-set value.

The gaming machines and other components of a gaming system of the invention may communicate in various manners. For example, the various components of the gaming system might communicate via wired or wireless links or combinations thereof.

In one embodiment, a gaming machine of the invention may be particularly configured to present the game(s) of the invention. In other embodiments, the game(s) may be presented on a gaming machine which is configured to present a variety of different games.

In one embodiment, the gaming machine is configured to present a game of the invention via game instructions. Such instructions may comprise machine readable code. For example, game code or software may be stored in a memory of the gaming machine and be executed by the controller thereof to effectuate the various steps of the game, including the generation and display of game information. Of course, the gaming machine might also have a controller having such instructions embedded therein.

It is also possible for the gaming machine 120 to comprise a desk-top computer, a lap-top computer or even a mobile device such as a hand-held or mobile unit. For example, a game of the invention might be presented via a mobile phone or at a personal computer. In such a configuration, the processor of the computer may execute code which presents game information via a display associated with the computer. A player might provide input via a touch screen, computer mouse or keyboard. A player might place a wager by providing credit card information to provide one or more credits and by then using an input to place a wager of those credits. In another embodiment, some or all of the game information might be generated remotely, such as at a remote game server, and be transmitted over a communication link to the player's computer.

In one embodiment, the game of the invention may be implemented as an "on-line" game. Such a game may be presented as a wager-based game or an amusement game. Such a game may be presented by a player utilizing their computer to access a game server via the Internet. The game server may transmit game code for execution by the user's computer for presenting the game.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A computer program product for causing a gaming machine having at least one display to present a game comprising:

machine readable code stored in a tangible medium comprising:

(a) instructions to cause said gaming machine to accept a wager from a player;

(b) instructions to cause said gaming machine to activate and display via said at least one display a first row of game symbols relative to a matrix of m rows by n columns of symbol positions;

(c) instructions to randomly generate and cause said gaming machine to display a row of base symbols having n positions;

(d) instructions for comparing, as to base symbols and game symbols appearing in corresponding n positions, said base symbols to said first row of game symbols for potential symbol matches;

(e) instructions to cause said gaming machine to award awards for symbol matches;

(f) instructions to cause said gaming machine to end said game if a required number of symbol matches are not received relative to said first row of game symbols; and (g) instructions to cause said game to continue by, if a required number of symbol matches are received relative to said first row of game symbols:

(h) activate and cause said gaming machine to display via said at least one display a next row of game symbols relative to said matrix of symbol positions;

(i) randomly generate and cause said gaming machine to display via said at least one display a new set of base symbols;

(j) compare said base symbols to all active game symbols which are in corresponding n positions for potential symbol matches;

(k) awarding awards for symbol matches;

(l) defining at least one predetermined winning pattern of two or more matched game symbols, at least one of said winning patterns comprising at least two matched game symbols located in at least two rows of said matrix of game symbols and, if a sufficient number of rows of gaming symbols are active to achieve said one or more predetermined winning patterns, determining whether any combinations of symbol matches comprise one or more of said predetermined winning patterns;

(m) awarding at least one award for any winning patterns;

(n) if a required number of symbol matches are not received relative to said next row of game symbols, end said game; and (o) if a required number of symbol matches are received relative to said next row of game symbols and any rows of said matrix of symbol positions remain unactivated, repeat steps (h)-(o).

2. The computer program product in accordance with claim 1 wherein the required number of symbol matches for each successive row of game symbols increases from the previous row.

3. The computer program product in accordance with claim 1 wherein said machine readable code includes instructions to cause said gaming machine to assign an award value relative to each of said symbol positions of said matrix, said award value for a position being awarded in the event of a symbol match to a symbol in that symbol position.

4. The computer program product in accordance with claim 1 wherein said machine readable code includes instructions for receiving input from a player of symbol matches by input to a touch screen relative of said gaming machine to a position of said matrix.

5. The computer program product in accordance with claim 1 wherein said machine readable code includes instructions to randomly assign a special symbol to one or more of said symbol positions of said matrix and in the event of a match of a symbol in one of said positions, automatically continue said game by repeating steps (h)-(l).

6. The computer program product in accordance with claim 1 wherein said special symbol comprises an image of a frog.

7. The computer program product in accordance with claim 1 wherein said predetermined winning patterns each require a matched game symbol in said first row of game symbols and said $m^{th}$ row of game symbols, whereby said predetermined winning patterns can only be achieved if all of said rows game symbols are activated of said matrix.

8. The computer program product in accordance with claim 1 wherein one or more of said predetermined winning patterns are selected from the group consisting of: at least one column of matched game symbols through said matrix, at least one diagonal of matched game symbols through said matrix, a "T" pattern of matched game symbols, an "X" pattern of matched game symbols, matched game symbols at four corners of said matrix and all of said game symbols matched in said matrix.

9. The computer program product in accordance with claim 1 wherein said matrix has five columns and said game symbols and said base symbols in a first column are randomly selected from the set of numbers 1-15; said game symbols and said base symbols in a second column are randomly selected from the set of numbers 16-30; said game symbols and said base symbols in a third column are randomly selected from the set of numbers 31-45; said game symbols and said base symbols in a fourth column are randomly selected from the set of numbers 46-60; and said game symbols and said base symbols in a fifth column are randomly selected from the set of numbers 61-75.

10. The computer program product in accordance with claim 1 wherein said base symbols may include a wild symbol, wherein said wild symbol may be matched to any game symbol in any symbol position of said matrix.

11. The computer program product in accordance with claim 1 wherein said base and game symbols comprise numbers, letters, icons and/or other indicia.

12. A gaming machine comprising:

a housing;

at least one user input;

at least one electronic display configured to display game information to a player;

at least one information storage device;

a controller configured to receive information from said at least one user input of inputs thereto and to display game information via said at least one display to said player; and instructions stored on the storage device and executable by the controller to present a game, the one or more instructions comprising:

instructions for accepting a wager from a player for initiating game play;

instructions for activating a first row of game symbols relative to a matrix of m rows by n columns of symbol positions;

instructions for randomly generating and displaying a row of base symbols having n positions;

instructions for comparing said base symbols to said first row of game symbols in corresponding n positions for potential symbol matches;

instructions for awarding awards for symbol matches;

instructions for ending said game if a required number of symbol matches are not received relative to said first row of game symbols;

instructions for activating at least a next row of game symbols relative to said matrix of symbol positions if a required number of symbol matches are received relative to said first row;

instructions for displaying a new set of base symbols for each next row of game symbols;

instructions for comparing said base symbols to all active game symbols which are in corresponding n positions for potential symbol matches;

instructions for awarding awards for symbol matches; and instructions for determining if any combinations of matched symbols comprise at least one predetermined winning pattern of matched symbols comprising at least two symbols in at least two different rows of said matrix;

awarding at least one award for any winning pattern of matched symbols.

13. The gaming machine in accordance with claim 12 further comprising at least one random number generator, wherein said instructions for displaying a row of base symbols comprises utilizing random numbers generated by said random number generator to generate symbols for display.

14. The gaming machine in accordance with claim 12 wherein said at least one display comprises a video display device and said game symbols and base symbols are computer generated images.

15. The gaming machine in accordance with claim 12 wherein said instructions comprise machine readable code.

16. The gaming machine in accordance with claim 12 further comprising instructions for causing said at least one display to display a game interface, said game interface comprising said matrix of symbol positions and a row of base symbol positions.

17. The method in accordance with claim 12 wherein said base and game symbols comprise numbers, letters, icons and/or other indicia.

18. A gaming machine comprising:

a housing;

a wager acceptor;

at least one electronic display configured to display game information to a player;

a controller configured to execute machine readable code to cause said gaming machine to:

(a) accept a wager from a player via said wager acceptor;

(b) display via at least one electronic display a matrix of m sets of game symbol positions, each set having n positions;

(c) activate a set of game symbols relative to said symbol positions of one of said sets of game symbol positions of said matrix;

(d) randomly generate and display via said at least one electronic display a set of base symbols having n positions;

(e) compare the base symbols to all activated game symbols in corresponding n positions for matches;

(f) if a required number of symbol matches are achieved, repeat steps (c)-(e) until game symbols are activated relative to all m sets of game symbol positions; and (g) award one or more awards for matches of individual game symbols and for the achieving one or more predetermined winning patterns comprising at least two matched game symbols in at least two of said m sets of game symbols.

19. The gaming machine in accordance with claim 18 wherein said set of game symbols comprises a row of a matrix of symbol positions.

20. The gaming machines in accordance with claim 18 wherein one or more of said predetermined winning patterns are selected from the group consisting of: a column of matched game symbols, a diagonal of matched game symbols, a “T” pattern of matched game symbols, an “X” pattern of matched game symbols, and matching all of said game symbols.

21. The gaming machine in accordance with claim 18 wherein said required number of symbol matches increases for sequential set of game symbols.

22. The gaming machine in accordance with claim 18 wherein n=5.

23. The gaming machine in accordance with claim 18 wherein said base and game symbols comprise numbers, letters, icons and/or other indicia.

* * * * *